(12) United States Patent
Morales et al.

(10) Patent No.: US 9,629,353 B2
(45) Date of Patent: Apr. 25, 2017

(54) BAIT RACK

(71) Applicant: LiphaTech, Inc., Milwaukee, WI (US)

(72) Inventors: Christopher H. Morales, Milwaukee, WI (US); Sandy Morales, Milwaukee, WI (US); Daniel M. Machak, Racine, WI (US); Raymond W. Finke, Memphis, TN (US); James J. Doll, Bayside, WI (US)

(73) Assignee: Liphatech, Inc., Milwaukee, WI (US)

( * ) Notice: Subject to any disclaimer, the term of this patent is extended or adjusted under 35 U.S.C. 154(b) by 204 days.

(21) Appl. No.: 14/477,533

(22) Filed: Sep. 4, 2014

(65) Prior Publication Data

US 2016/0066558 A1 Mar. 10, 2016

(51) Int. Cl.
*A47J 47/16* (2006.01)
*A01M 25/00* (2006.01)

(52) U.S. Cl.
CPC ........ *A01M 25/002* (2013.01); *A01M 25/004* (2013.01); *A47J 47/16* (2013.01)

(58) Field of Classification Search
CPC .............. A47J 47/16; A47J 47/00; A47J 37/06
USPC .... 211/41.4, 85.31, 133.2, 133.5; 43/58, 64, 43/73
See application file for complete search history.

(56) References Cited

U.S. PATENT DOCUMENTS

| | | | | |
|---|---|---|---|---|
| 2,600,755 | A | * | 6/1952 | Greensfelder .......... A47J 47/16 211/106 |
| RE28,586 | E | * | 10/1975 | Dahlquist ............... F24B 1/193 126/298 |
| 4,848,217 | A | * | 7/1989 | Koziol ................ A47J 37/0694 211/181.1 |
| D308,317 | S | * | 6/1990 | Koziol .......................... D7/409 |

OTHER PUBLICATIONS

U.S. Appl. No. 29/501,511, filed Sep. 4, 2014, LiphaTech, Inc.
Rodent Feeder Bar, Braintree Scientific, Inc.: Lab Research Products, available at http://www.braintreesci.com/prodinfo.asp?number=FD-BAR, believed to be publically available prior to Sep. 4, 2014, accessed on Sep. 9, 2014, 1 page.
N10 Mouse Lid, Ancare, available at http://www.ancare.com/products/cages-and-caging-equipment/wire-bar-lid/n10-mouse-lid, believed to be publically available prior to Sep. 4, 2014, accessed on Sep. 9, 2014, 1 page.
N40 Large Mouse Lid, Ancare, available at http://www.ancare.com/products/cages-and-caging-equipment/wire-bar-lid/n40-mouse-lid, believed to be publically available prior to Sep. 4, 2014, accessed on Sep. 9, 2014, 1 page.
Photo of cage top, Braintree Scientific, Inc., believed to be publically available prior to Sep. 4, 2014.

* cited by examiner

*Primary Examiner* — Cassandra Davis
(74) *Attorney, Agent, or Firm* — Reinhart Boerner Van Deuren s.c.

(57) ABSTRACT

A bait rack is provided. The bait rack includes a bait support portion defining an open-topped bait pocket and an access (Continued)

aperture configured to provide access to the bait pocket from below the bait support portion. The bait rack includes a base configured to support the bait support portion above a work surface.

13 Claims, 16 Drawing Sheets

BAIT RACK

BACKGROUND OF THE INVENTION

Field of the Invention

The present invention relates generally to pest control products and, more particularly to a rodent bait station.

Bait including toxins, poison, etc., may be used to attract rodents. Rodents ingest the bait and are killed by the toxins, poison, etc., in the bait. To prevent non-targeted animals, e.g., pets, etc., and unauthorized individuals, e.g., children, from coming into contact with or accidentally ingesting the bait, the bait may be located in a housing of a rodent bait station. The housing may include an opening configured to allow rodents access to the interior of the bait station to access the bait.

SUMMARY OF THE INVENTION

One embodiment of the invention relates to a bait rack. The bait rack includes a bait support portion. The bait support portion defines an open-topped bait pocket. The bait support portion defines an access aperture configured to provide access to the bait pocket from below the bait support portion. The bait rack includes a base configured to support the bait support portion above a work surface.

Another embodiment of the invention relates to a bait rack. The bait rack includes a base. The base includes a first leg having a first portion extending in a first direction and a second portion extending generally perpendicularly to the first portion. The base includes a second leg spaced apart from the first leg and having a first portion extending in the first direction and a second portion extending generally perpendicularly to the first portion. The base includes a cross-member extending between the first leg and the second leg. The bait rack includes a bait support portion. The bait support portion includes a first bar and a second bar. The first bar and the second bar each include a first portion coupled to and extending from the cross-member non-parallel to the first portion of the first leg and a second portion curving upwardly from the first portion. The first bar and the second bar define an access aperture therebetween.

Another embodiment of the invention relates to a bait rack. The bait rack includes at least ten bars each including a first portion extending in a first direction and a second portion extending in a second direction different from the first direction. The second direction forms an angle of at least 45° relative to horizontal. The bars are each spaced apart from one another by less than 0.5 inches. The bait rack includes a support configured to support the bars above a work surface.

Alternative exemplary embodiments relate to other features and combinations of features as may be generally recited in the claims.

DESCRIPTION OF THE DRAWINGS

This application will become more fully understood from the following detailed description, taken in conjunction with the accompanying figures wherein like reference numerals refer to like elements in which.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE EXEMPLARY EMBODIMENTS

Referring to the Figures generally, an embodiment of a bait station is provided. Various different types of bait, e.g., bait blocks, soft bait, etc., may be placed in the bait station. Soft bait may be provided in wrappers, e.g., sachets, paper sachets, etc. When rodents consume the bait, portions of the wrappers may be left behind and/or may become located outside of the bait station, which may be undesirable, e.g., be visually displeasing, potentially have portions of bait stuck to scraps of wrapper located outside the bait station, etc. Therefore, an embodiment of a bait rack is provided to support the bait in the housing. The bait rack is configured to allow bait, e.g., soft bait, to be placed directly on the rack without a wrapper. Additionally, the bait rack allows rodents to access the bait located on the bait rack from below, but not to remove all of the bait from the bait rack at once. Moreover, the bait rack allows bait to be dropped into the bait compartment of the bait rack without the need to further manipulate the bait to secure it within the bait station, e.g., without need to secure bait, e.g., to bait rods, etc.

Figure 1:
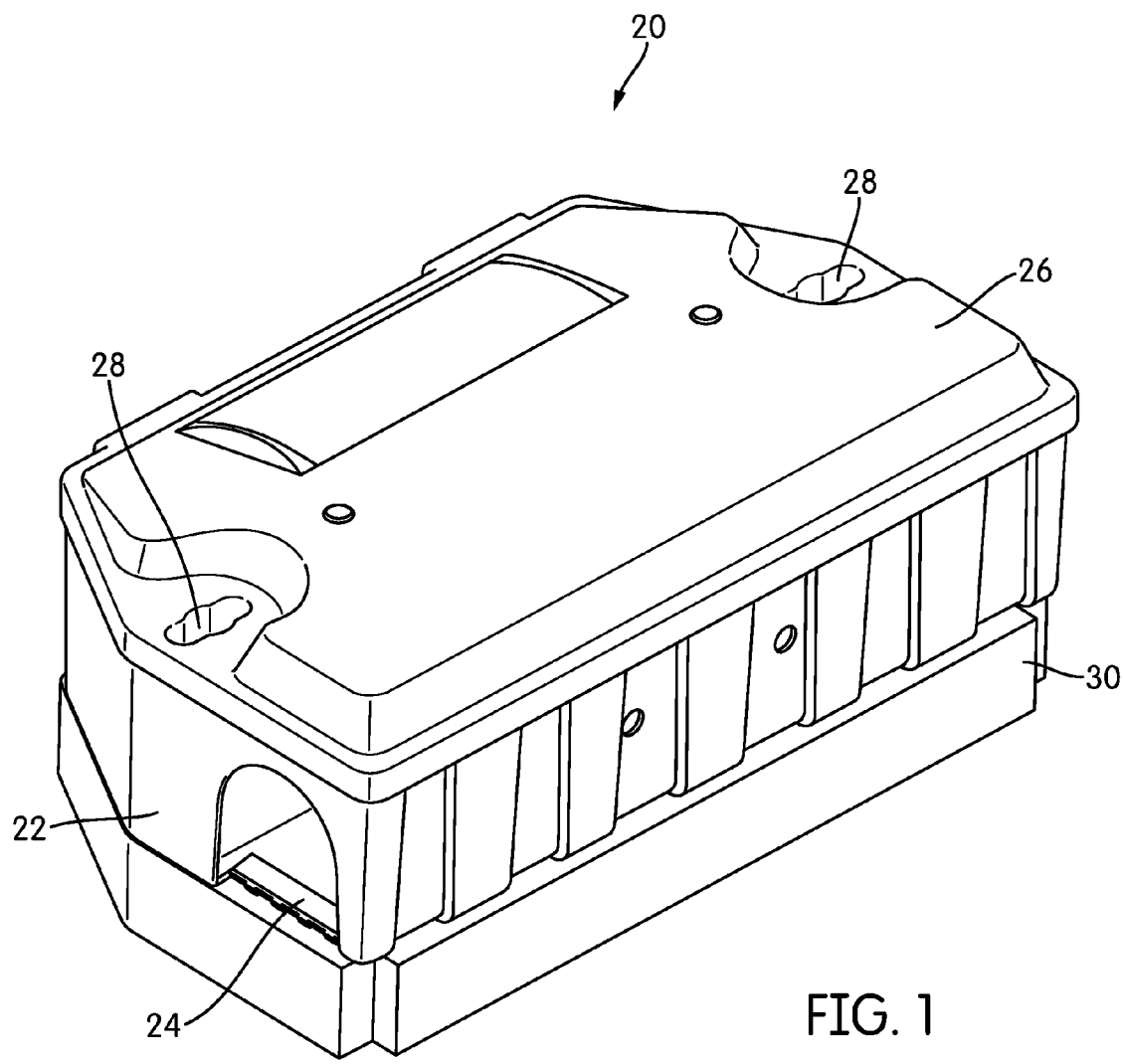
FIG. 1 is a perspective view of a bait station according to an exemplary embodiment.

With reference to FIG. 1, an embodiment of a bait station 20 is illustrated. The bait station 20 includes a housing 22 inside which bait will be located. The housing 22 includes an opening 24 through which rodents may gain access to the bait inside of the housing 22. The housing 22 includes a pivotable lid 26 which a user may pivot into an open configuration (shown in a closed configuration in FIG. 1) to load bait inside the housing 22. The lid 26 includes keyholes 28 through which a locking mechanism may be actuated by a key to lock the lid 26 in the closed configuration, e.g., after bait has been loaded into the bait station 20, and to unlock the lid 26 to allow it to be pivoted to an open configuration to allow loading of bait into the bait station 20. The bait station 20 also includes a bottom anchoring portion, shown as concrete base 30, configured to anchor the housing 22 to prevent movement of the housing 22, e.g., by rodents, wind, etc.

Figure 2:
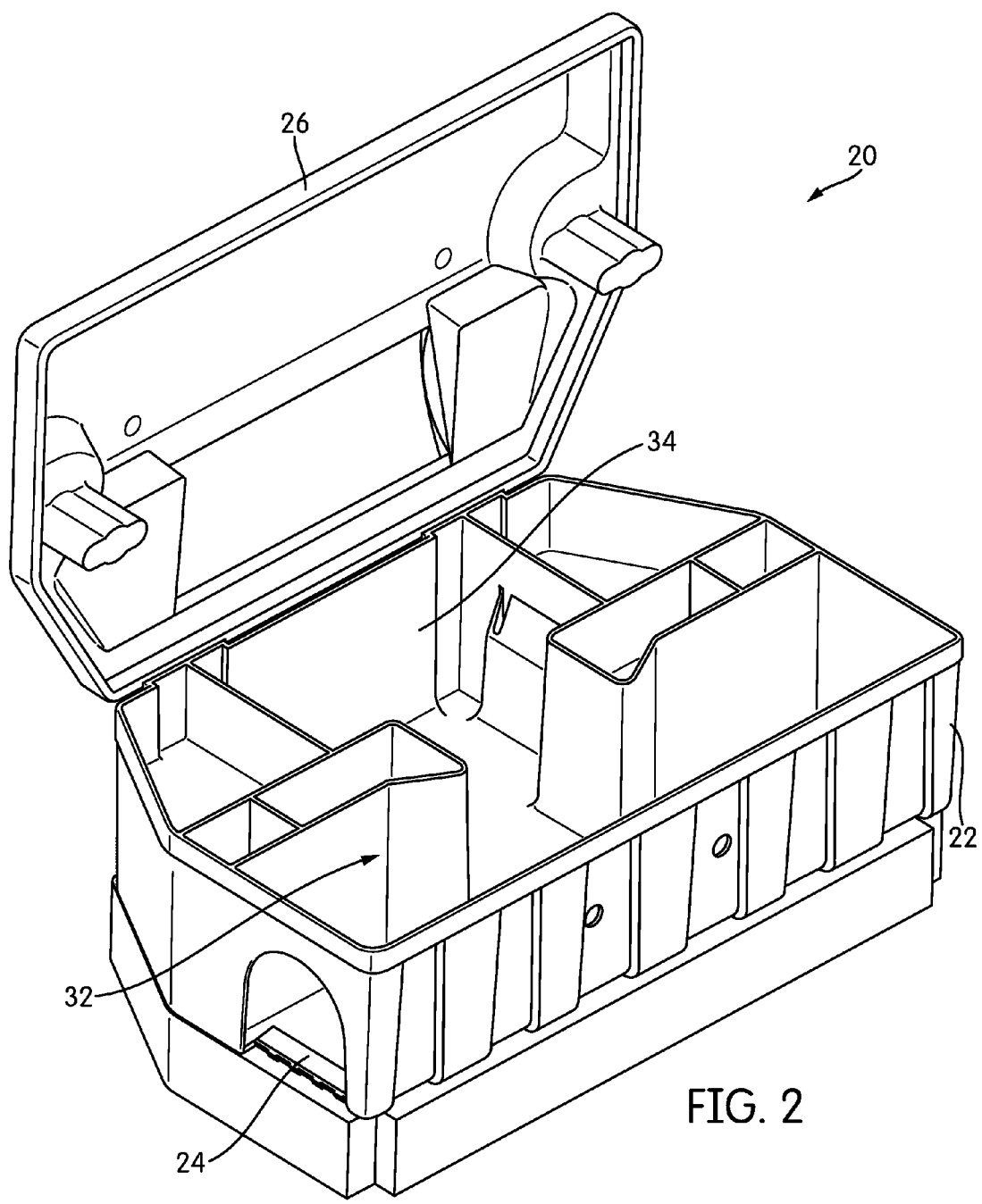
FIG. 2 is a perspective view of the bait station of FIG. 1 with a lid in an open configuration according to an exemplary embodiment.
Figure 3:
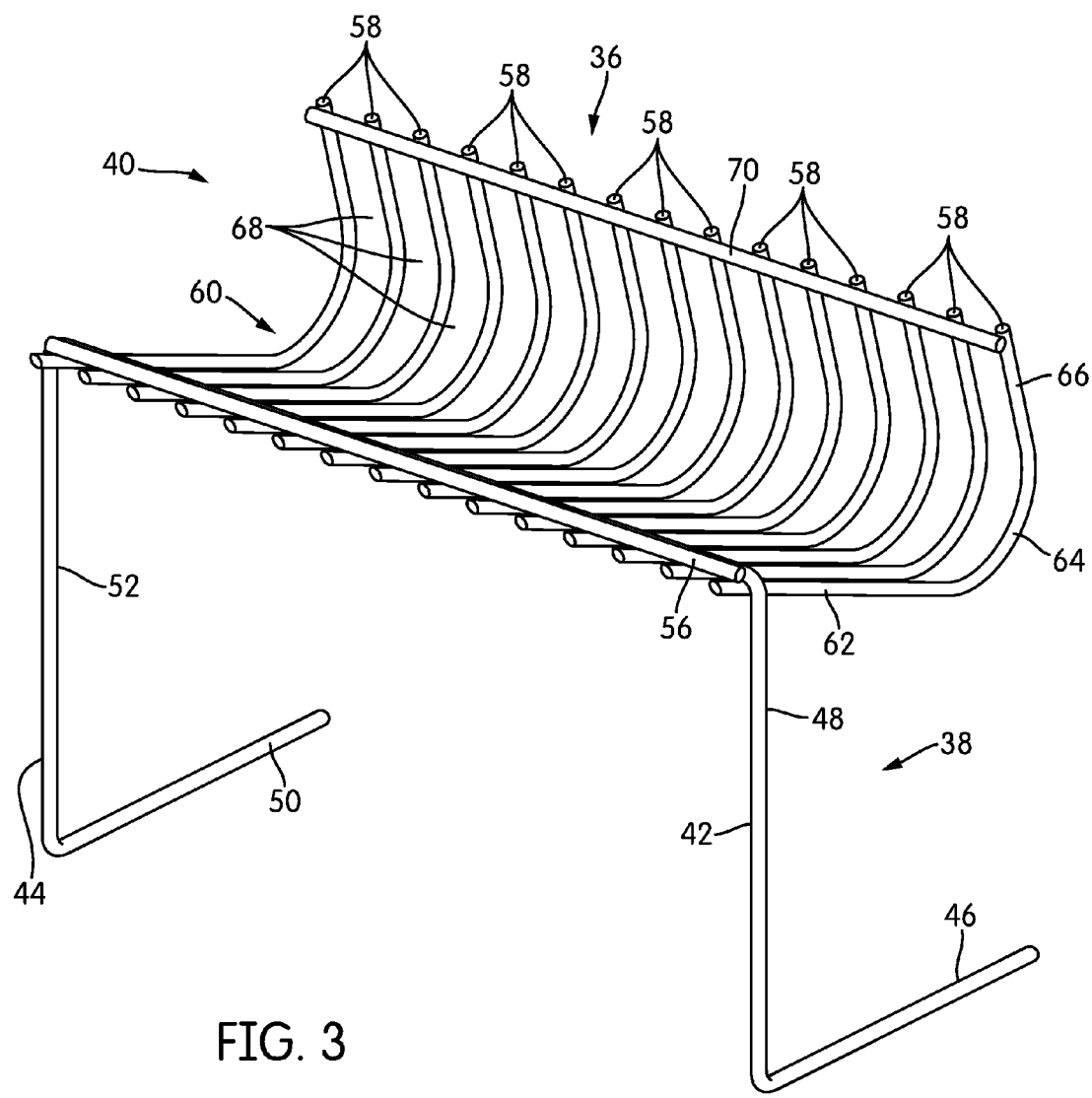
FIG. 3 is a perspective view of a bait rack according to an exemplary embodiment.

FIG. 2 illustrates an embodiment of a bait station 20 with the lid 26 in an open configuration. The opening 24 in the housing 22 provides access to a passage 32 which leads to a bait chamber 34. In one embodiment the housing 22 also includes an opening at the opposite side of the passage 32 from the opening 24. A bait rack 36 (see FIG. 3) may be located in the bait chamber 34 to secure bait within the housing 22 while allowing rodents to consume the bait.

With reference to FIGS. 3-7, an embodiment of a bait rack 36 is illustrated. The bait rack 36 includes a base 38 and a bait support portion 40 supported by the base 38 above a work surface, such as, e.g., the floor of a housing of a bait station. The base 38 includes a first leg 42 and a second leg 44. The first leg 42 includes a first portion 46 and a second portion 48 extending generally perpendicular to the first portion 46. The first portion 46 is configured to extend along a work surface such as, e.g., a floor of a housing of a bait station, to support the bait rack 36. The second leg 44 also includes a first portion 50 and a second portion 52 extending generally perpendicular to the first portion 50. The first portion 50 is configured to extend along a work surface such as, e.g., a floor of a housing of a bait station, to support the bait rack 36. In one embodiment, the first portion 46 of the first leg 42 and the first portion 50 of the second leg 44 are generally parallel. In one embodiment, the second portion 48 of the first leg 42 and the second portion 52 of the second leg 44 are generally parallel.

With further reference to FIGS. 3-7, in one embodiment, a cross-member 54 extends between the second portion 48 of the first leg 42 and the second portion 52 of the second leg 44. In one embodiment, the first leg 42, the second leg 44, and the cross-member 54 are unitarily formed, e.g., a single piece of metal. In other embodiments, the first leg 42, the second leg 44, and the cross-member 54 are formed from separate pieces of material coupled together. In one embodiment, the pieces are welded. The bait support portion 40 is coupled to the underside of the cross-member 54. In one embodiment, the bait support portion 40 is welded to the underside of the cross-member 54. The bait rack 36 also includes a second cross-member 56. The bait support portion 40 is coupled to the underside of the second cross-member 56. In one embodiment, the bait support portion 40 is welded to the underside of the second cross-member 56. The second cross-member 56 is located on the opposite side of the cross-member 54 from the first portions 46 and 50 of the legs 42 and 44. In one embodiment, the second cross-member 56 may provide additional strengthening and/or stiffness and/or support for the bait support portion 40.

Figure 4:
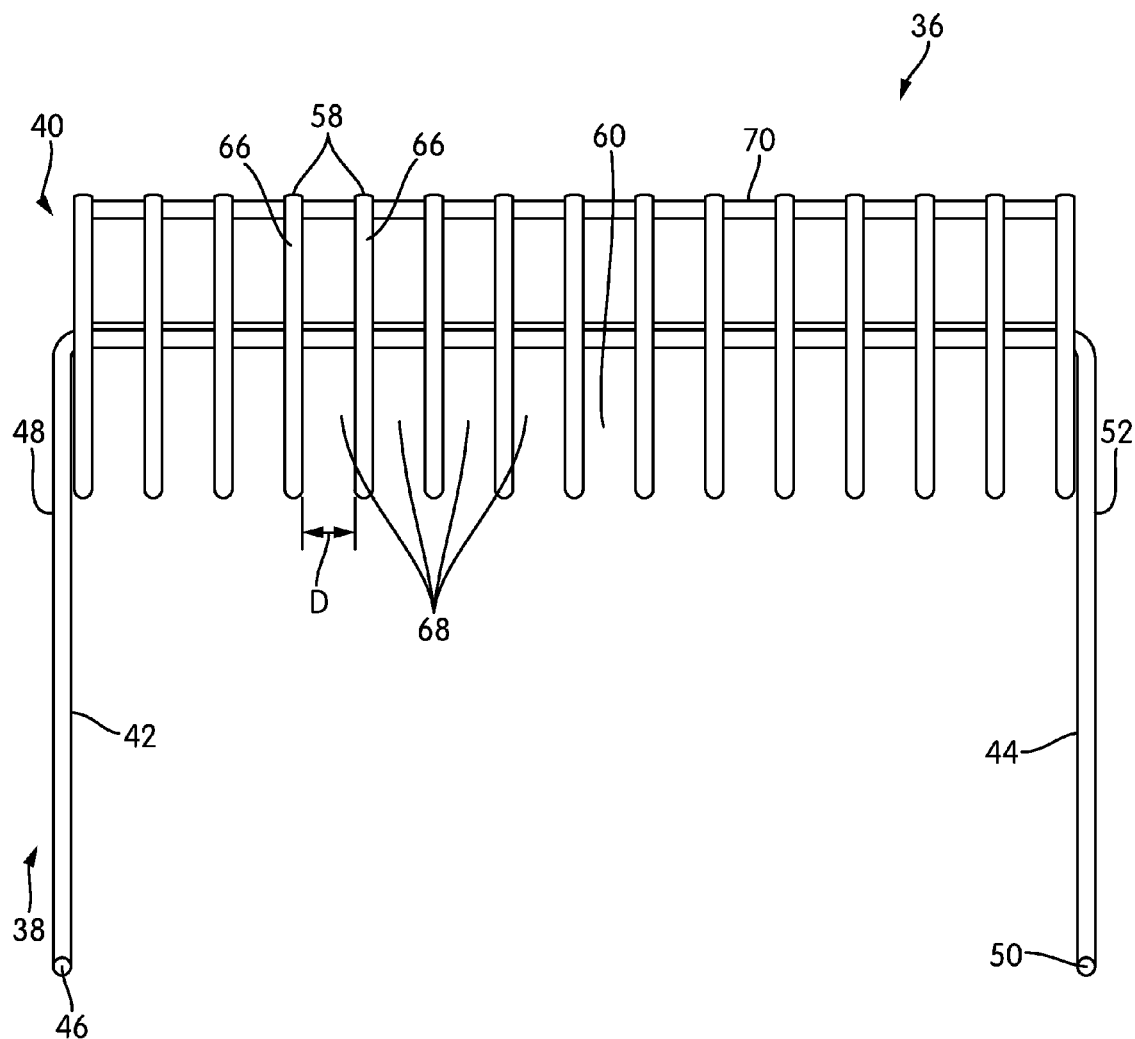
FIG. 4 is a front view of the bait rack of FIG. 3 according to an exemplary embodiment.
Figure 5:
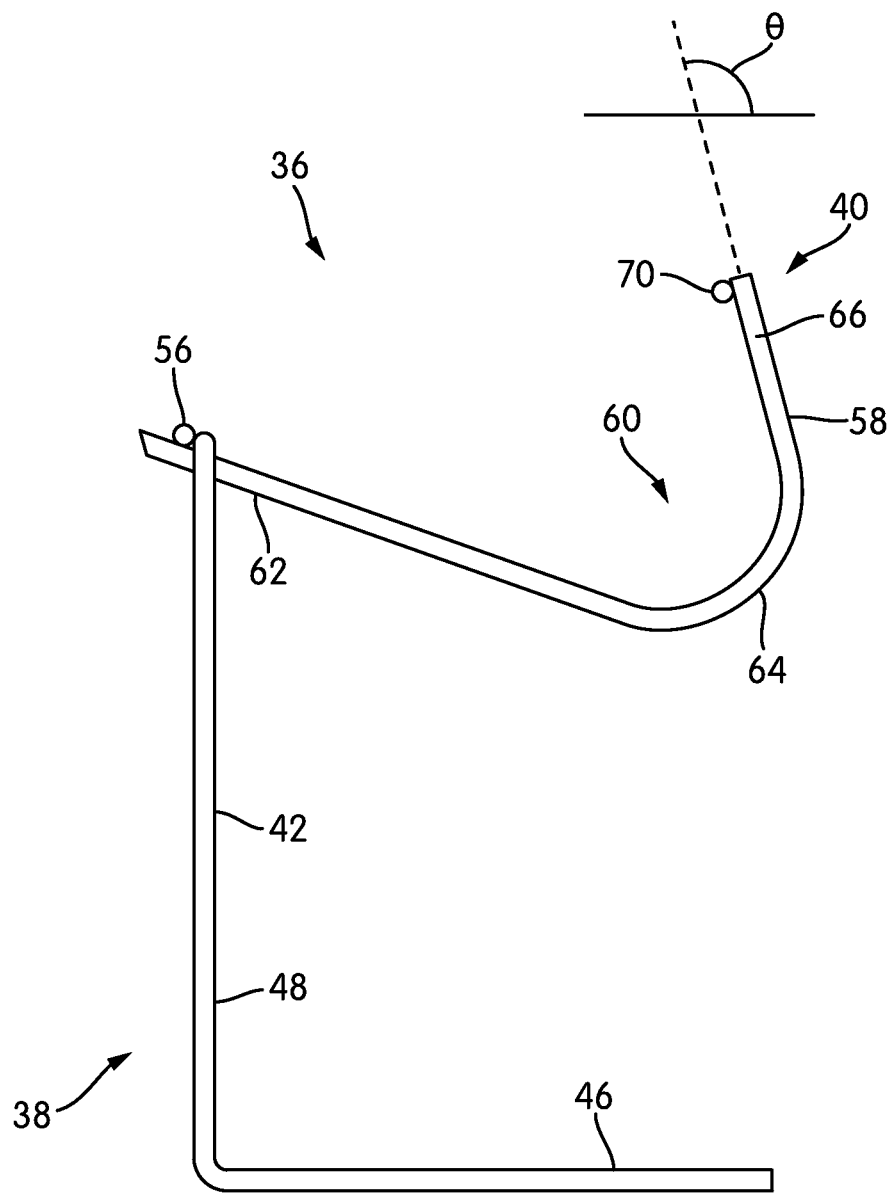
FIG. 5 is a side view of the bait rack of FIG. 3 according to an exemplary embodiment.
Figure 6:
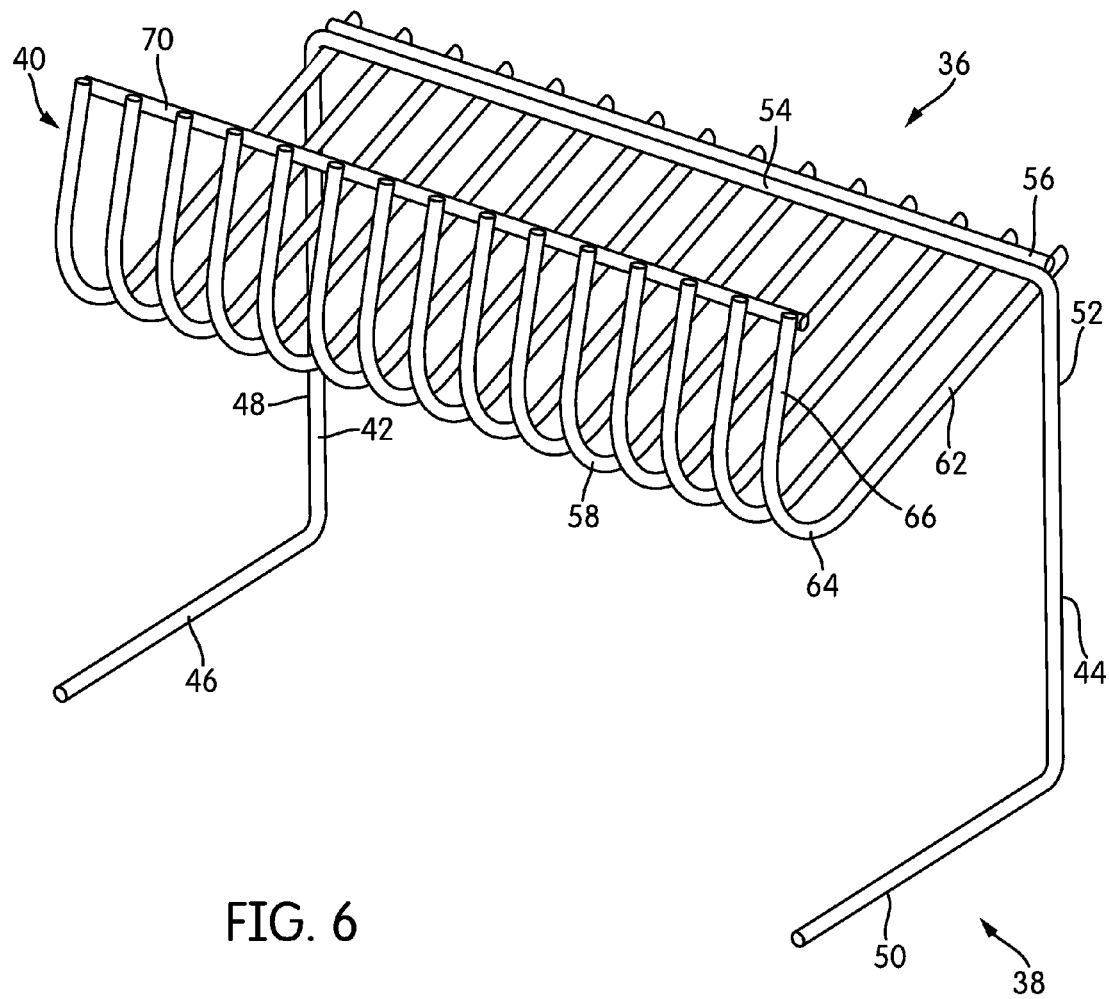
FIG. 6 is a perspective view of the bait rack of FIG. 3 according to an exemplary embodiment.
Figure 7:
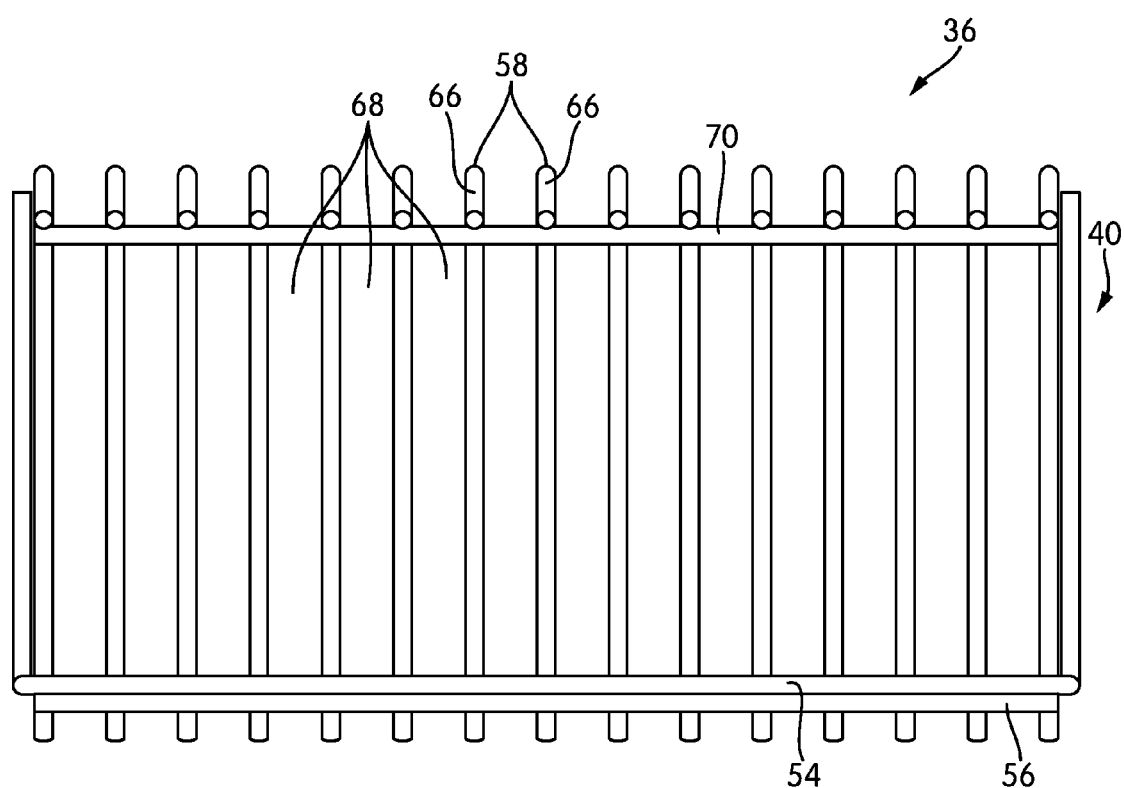
FIG. 7 is a top view of the bait rack of FIG. 3 according to an exemplary embodiment.

In another embodiment, a first leg is integrally formed with a first cross-member coupled to the bait support portion and a second leg is integrally formed with a second cross-member, different from the first cross-member, coupled to the bait support portion With further reference to FIGS. 3-7, the bait support portion 40 includes a plurality of bars 58 (some left unlabeled in some figures for clarity). In the illustrated embodiment, fifteen bars 58 are provided. In other embodiments, other suitable numbers of bars may be used. The bars 58 are shaped to form a bait pocket 60, e.g., an open-topped bait pocket, configured to receive bait therein from above. The bars 58 each include a first portion 62 extending angularly downwardly away from the cross-members 54 and 56. In one embodiment, the first portion 62 extends non-parallel to horizontal and non-parallel to the first portions 46 and 50 of the first and second legs 42 and 44. The first portion 62 extends to a second rounded portion 64 which curves upwardly to a third portion 66. With reference to FIG. 5, in one embodiment, the third portion 66 extends in a direction forming an angle θ. In one embodiment, the angle θ is at least 45° relative to horizontal. In another embodiment, the angle θ is at least 90° relative to horizontal. In another embodiment, the angle θ is more than 90° relative to horizontal. In another embodiment, the angle θ is 95° relative to horizontal.

With reference to FIG. 4, the bars 58 are configured to provide access, e.g., limited access, to bait located in the bait pocket 60 from below the bars 58, e.g., to rodents below the bars 58. The bait support portion 40 provides access apertures, shown as gaps 68 between the bars 58. The gaps 68 are configured to allow rodents to eat bait located in the bait pocket 60 from below the bars 58, but to limit the amount of bait that can be removed from the bait pocket 60 by the rodent at once, e.g., prevent removal of large portions and/or all of the bait from the bait pocket 60 in one bite, pull by the rodent, etc. Each of the bars 58 are spaced apart from each of the other bars 58 a distance D, e.g., the gaps 68 extend a distance D. In one embodiment, the distance D is less than 0.5 inches. In another embodiment, the distance D is less than 0.25 inches. In another embodiment, the distance is 0.25 inches. Coupled to the third portions 66 of the bars 58 is a third cross-member 70. In one embodiment, the third portions 66 are welded to the third cross-member 70. In one embodiment, the third cross-member 70 may provide additional strengthening and/or stiffness and/or support for the bait support portion 40.

Figure 8:
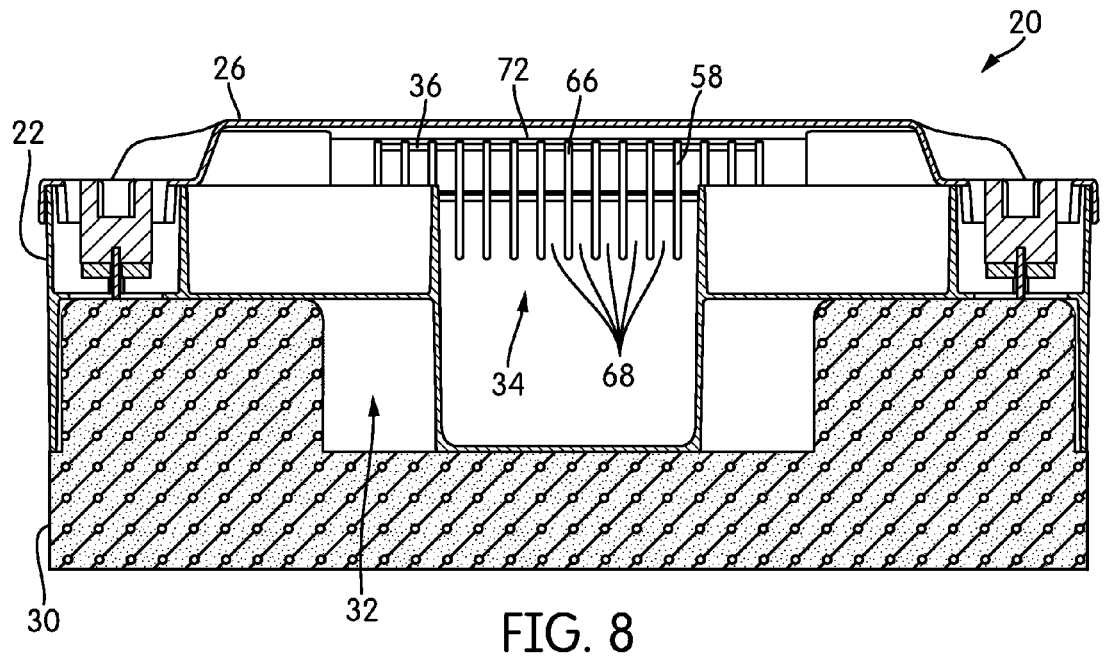
FIG. 8 is a cross-sectional view of a bait station according to an exemplary embodiment.
Figure 9:
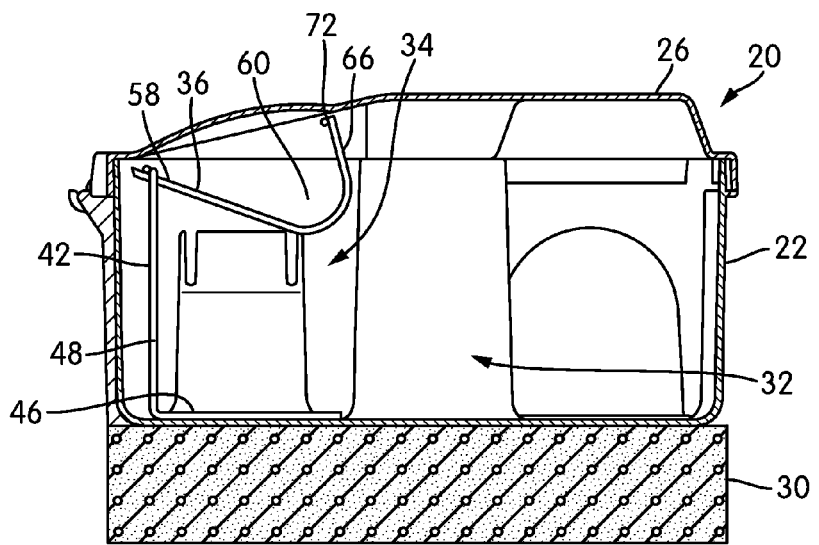
FIG. 9 is a cross-sectional view of a bait station according to an exemplary embodiment.
Figure 10:
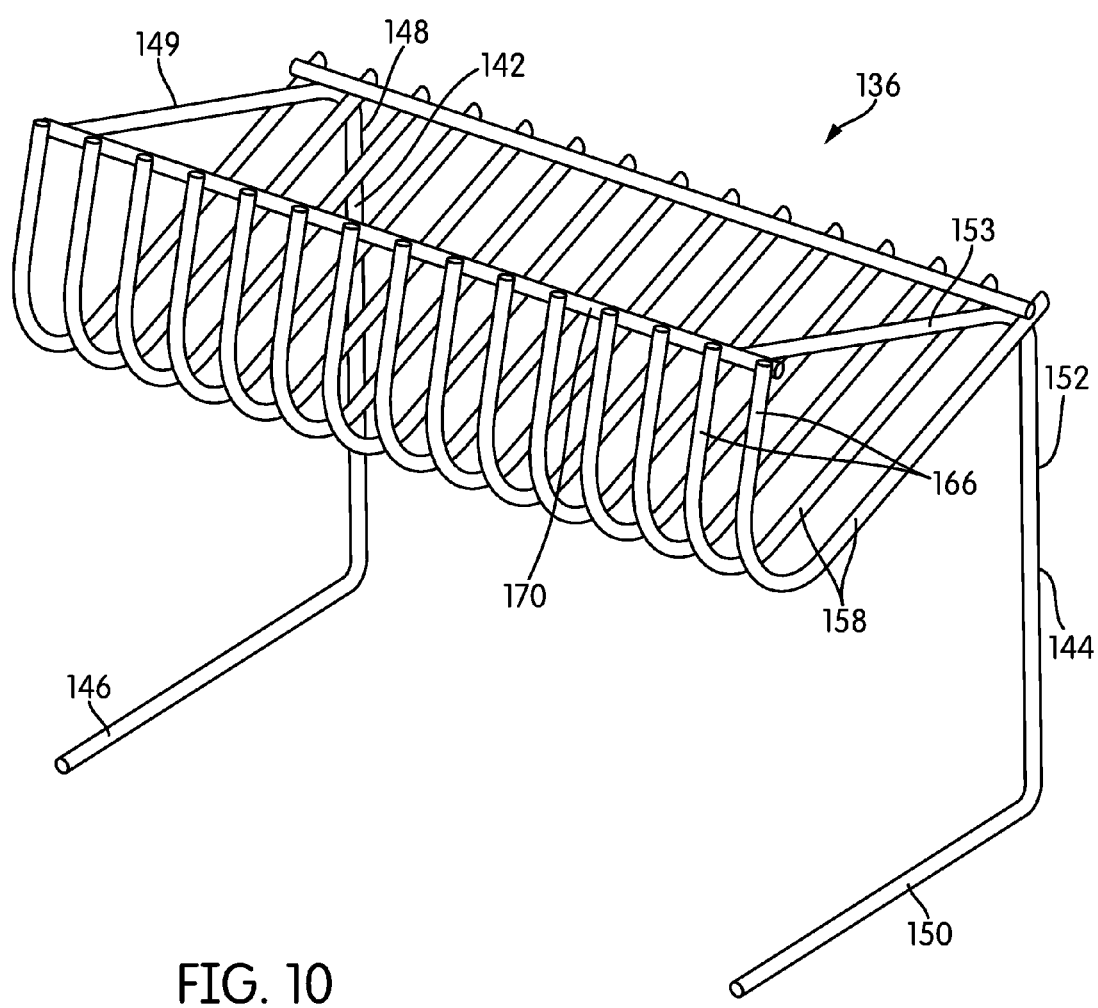
FIG. 10 is a perspective view of a bait rack according to an exemplary embodiment.
Figure 11:
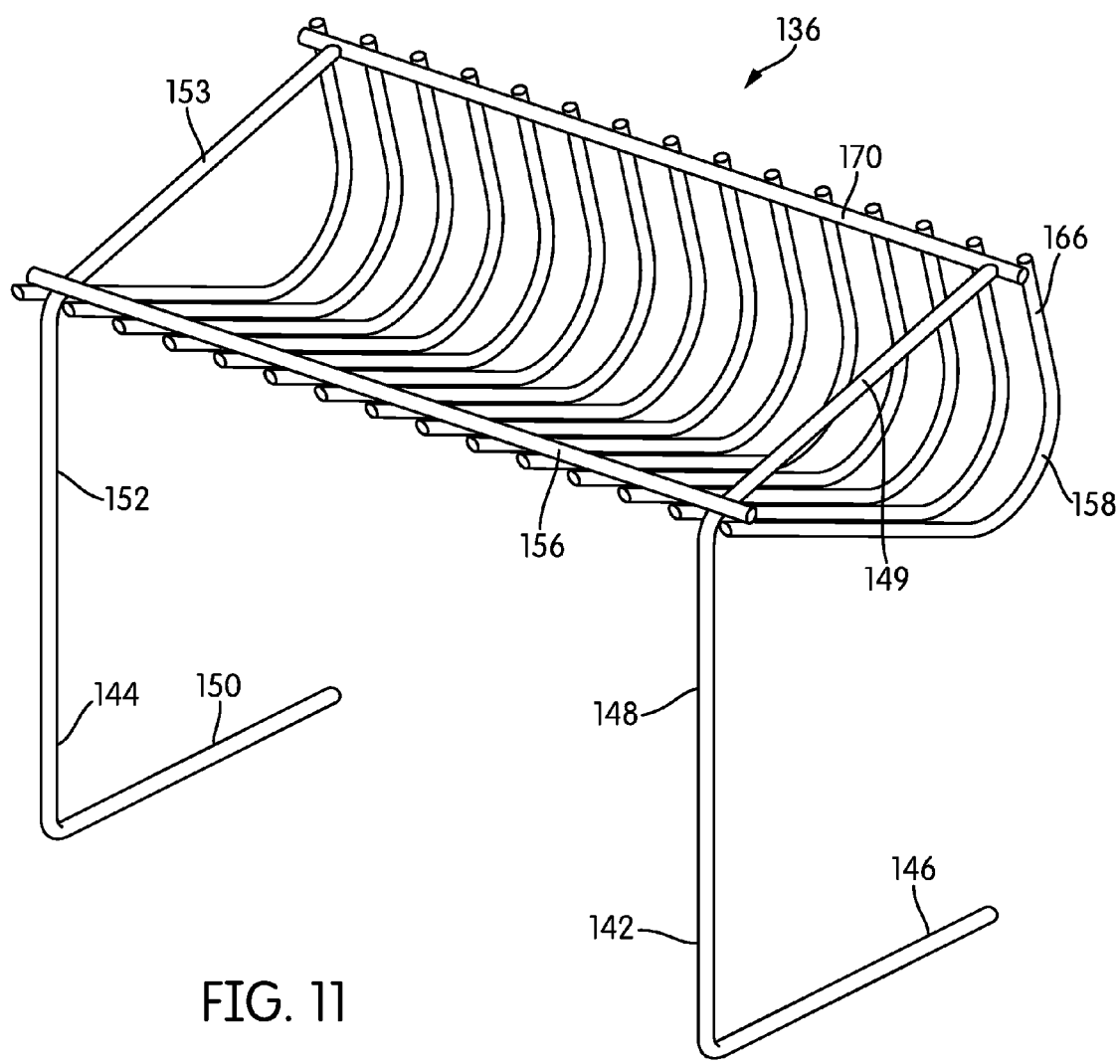
FIG. 11 is a perspective view of the bait rack of FIG. 10 according to an exemplary embodiment.

With reference to FIGS. 8 and 9, in one embodiment, the bait rack 36 is configured to be located in the bait chamber 34 of the bait station 20. Bait may be loaded, e.g., dropped into, the bait pocket 60 with the lid 26 in an open configuration. In one embodiment, bait may be placed directly in the bait pocket 60 on the bars 58, e.g., without a wrapper. With the lid in a closed configuration, as illustrated in FIGS. 8 and 9, bait in the bait pocket 60 may be accessed, e.g., eaten, from below the bars 58 through the gaps 68 by a rodent, e.g., rodent having travelled along the passage 32, etc. In one embodiment, there is a gap 72 between the upper peripheries of the third portions 66 of the bars 58 and the lower surface of the lid 26 when the lid is in a closed configuration. The bait rack 36 is configured not to allow rodent access to the bait pocket 60 through the gap 72. In one embodiment, the gap 72 between the upper peripheries of the third portions 66 of the bars 58 and the lower surface of the lid 26 is less than the distance D (see FIG. 4) between the bars 58.

With reference to FIGS. 10-17, another embodiment of a bait rack 136. The bait rack 136 includes various features similar to the bait rack 36. Therefore, differences from bait rack 36 are the focus of the description below.

In one embodiment, the first leg 142 of the bait rack 136 includes a first portion 146 and a second portion 148 extending generally perpendicular to the first portion 146. The first leg 142 also includes a third side member portion 149 extending from the second portion 148 to a cross-member 170 coupled to the third portions 166 of the bars 158. In one embodiment, the first 146, second 148, and third 149 portions of the first leg 142 are unitarily formed, e.g., a single piece of metal. In one embodiment, the third portion 149 is coupled to the cross-member 170. In one embodiment, the third portion 149 is welded to the cross-member 170. The second leg 144 of the bait rack 136 includes a first portion 150 and a second portion 152 extending generally perpendicular to the first portion 150. The second leg 144 also includes a third side member portion 153 extending from the second portion 148 to the cross-member 170 coupled to the third portions 166 of the bars 158. In one embodiment, the first 150, second 152, and third 153 portions of the second leg 144 are unitarily formed, e.g., a single piece of metal. In one embodiment, the third portion 153 is coupled to the cross-member 170. In one embodiment, the third portion 153 is welded to the cross-member 170. In one embodiment, each of the legs 142 and 144 is located inside of the outermost bar 158. In one embodiment, the third portion 149 and the third portion 153 are each coupled to the cross-member 156. In one embodiment, the third portion 149 and the third portion 153 are each welded to the cross-member 156.

Figure 12:
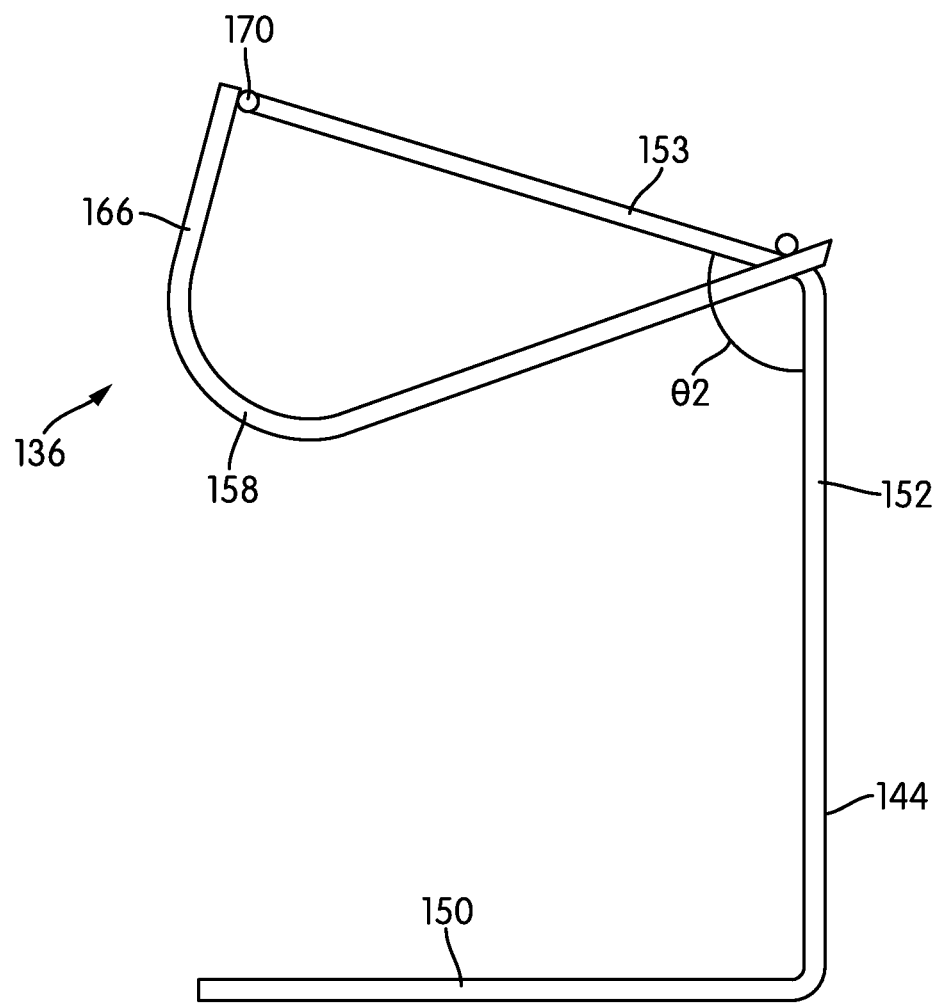
FIG. 12 is a side view of the bait rack of FIG. 10 according to an exemplary embodiment.
Figure 13:
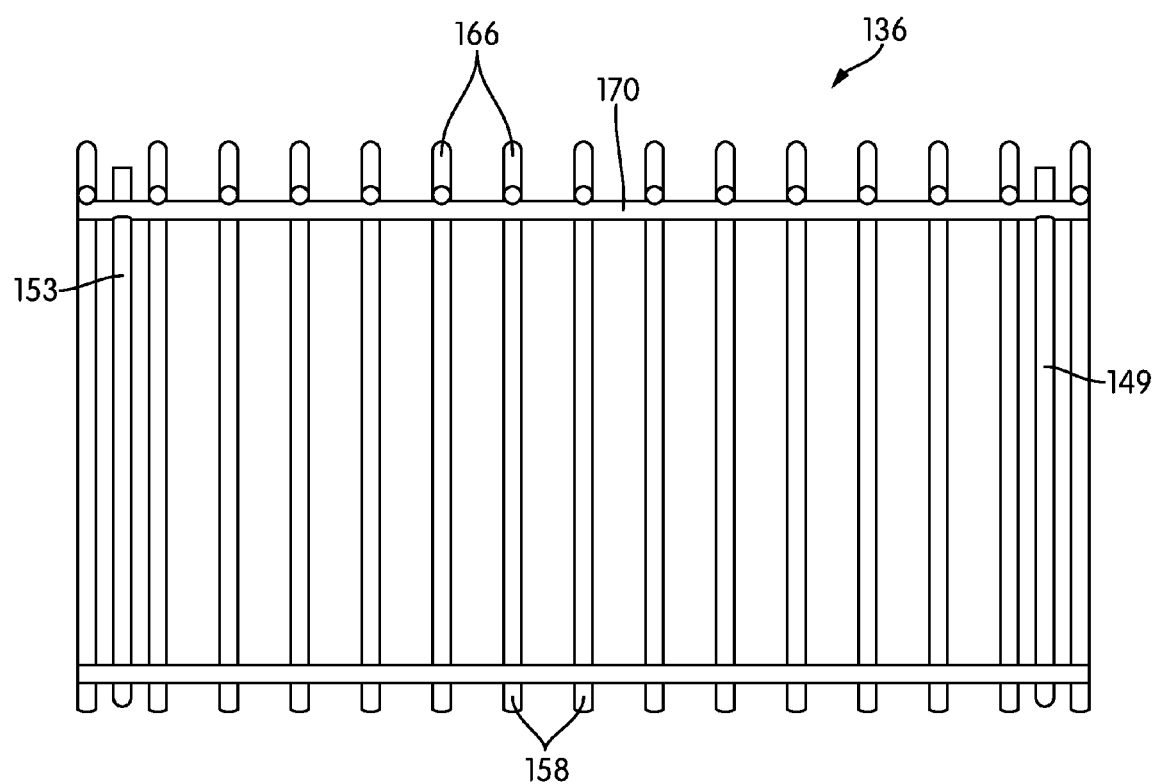
FIG. 13 is a top view of the bait rack of FIG. 10 according to an exemplary embodiment.
Figure 14:
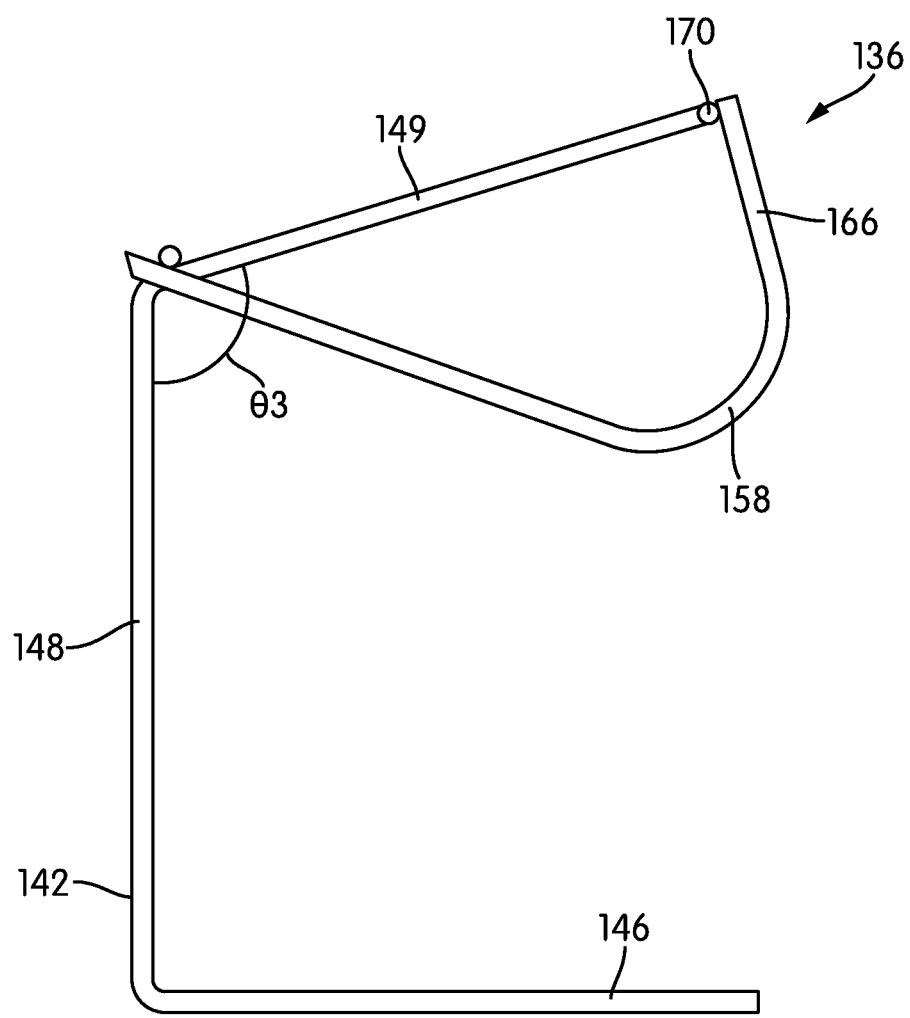
FIG. 14 is a side view of the bait rack of FIG. 10 according to an exemplary embodiment.
Figure 15:
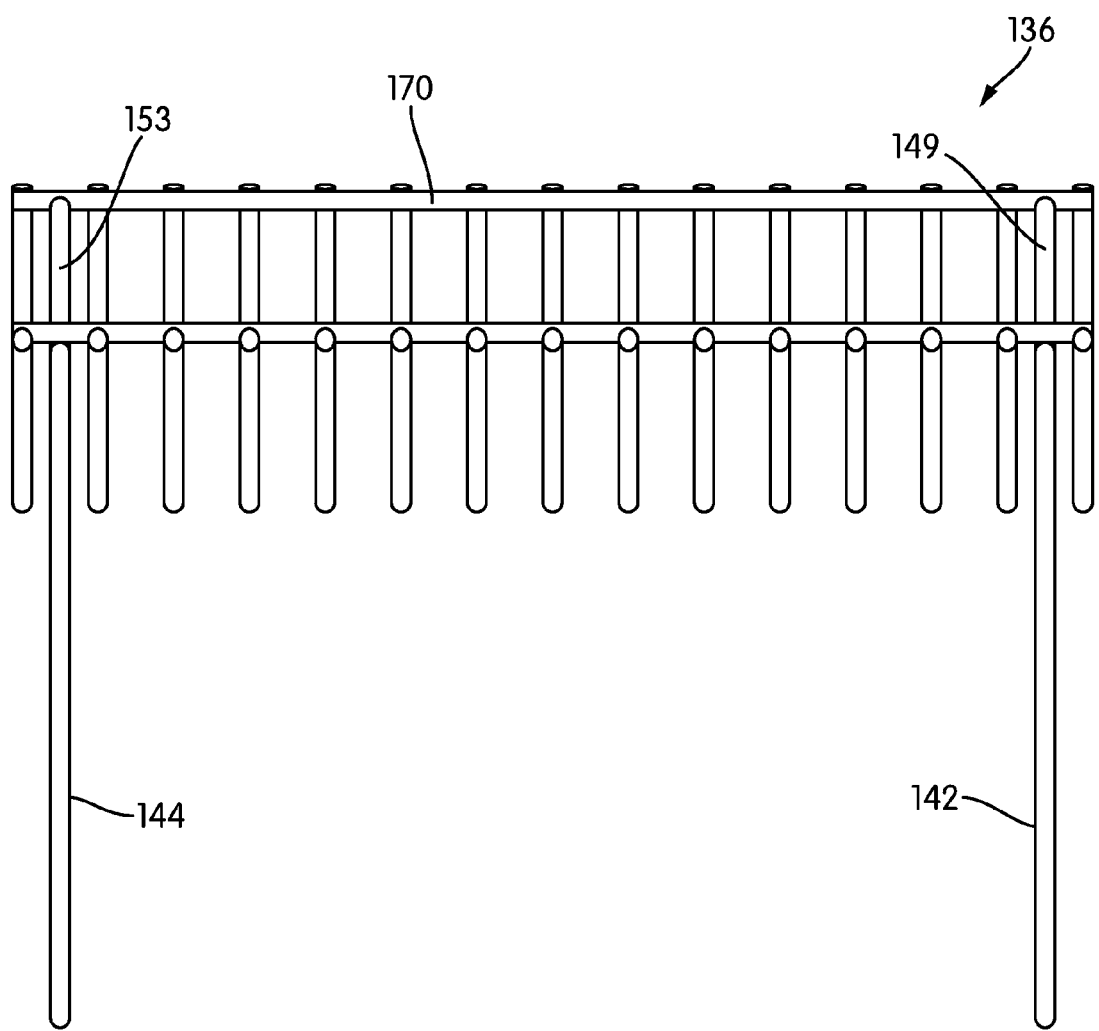
FIG. 15 is a rear view of the bait rack of FIG. 10 according to an exemplary embodiment.
Figure 16:
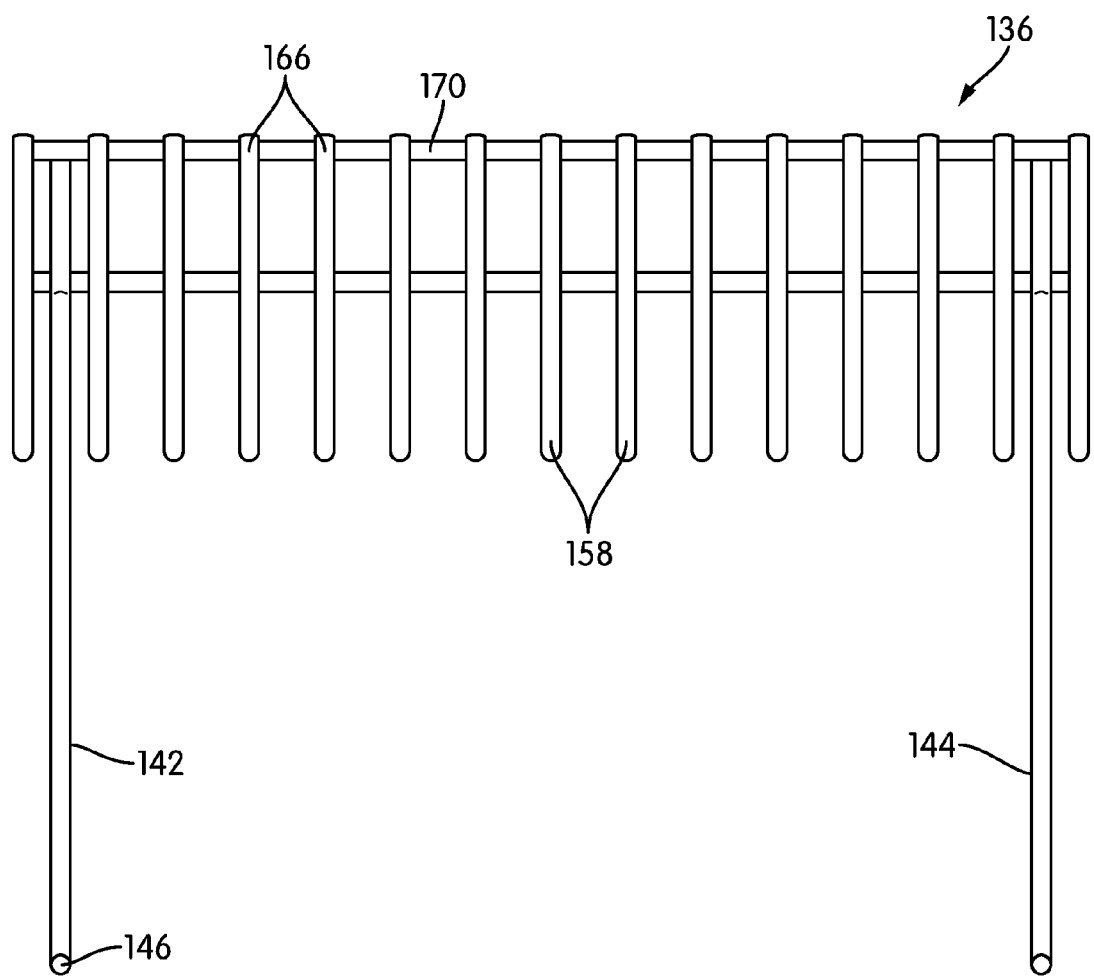
FIG. 16 is a front view of the bait rack of FIG. 10 according to an exemplary embodiment.
Figure 17:
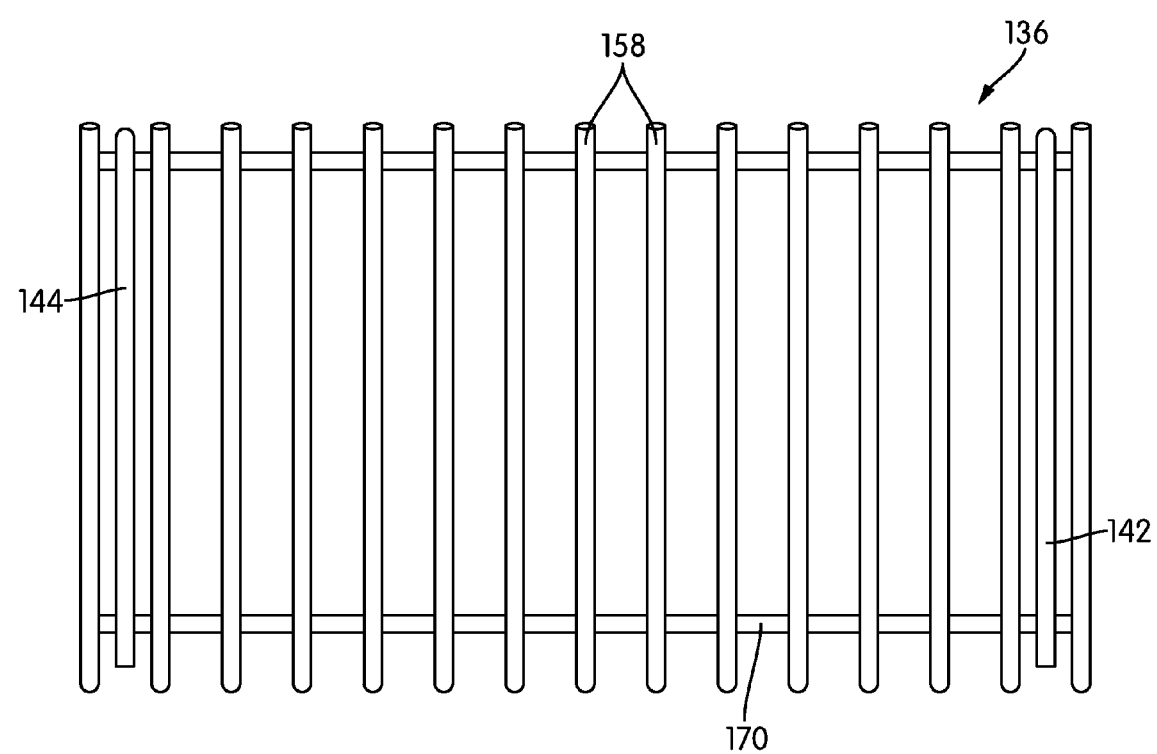
FIG. 17 is a bottom view of the bait rack of FIG. 10 according to an exemplary embodiment.

With reference to FIGS. 12 and 14, in one embodiment, the third portion 153 extends at an angle θ2 from the second portion 152 of the second leg 144. In one embodiment, the angle θ2 is greater than 90°. In one embodiment, the third portion 149 extends at an angle θ3 from the second portion 148 of the first leg 142. In one embodiment, the angle θ3 is greater than 90°. In one embodiment, the angles θ2 and θ3 are equal.

In one embodiment, soft bait rodenticide, such as, for example, FIRSTSTRIKE® and/or RESOLV®, available from LIPHATECH, Inc., may be used on the bait rack. In one embodiment, soft bait rodenticide may provide greater palatability and heat resistance relative to rodenticide mini blocks. In one embodiment, soft bait rodenticide may contain less wax (and/or no wax) compared to rodenticide mini blocks, which may enhance palatability.

In one embodiment, toxin and/or poison in rodent bait may include, for example, a single feed anticoagulant, such as difethialone. In another embodiment, toxin and/or poison in rodent bait may include bromadiolone. In another embodiment, the rodent bait may be non-toxic.

In various embodiments, bait racks disclosed herein may be made from metal, e.g., steel, stainless steel, etc. In other embodiments, other suitable materials may be used.

For purposes of this disclosure, the term "generally perpendicular" will mean, for example, within ±10° of 90° and the term "generally parallel" will mean, for example, within ±10° of parallel.

Certain terminology is used herein for convenience only and is not to be taken as a limitation on the present invention. Relative language used herein is best understood with reference to the drawings, in which like numerals are used to identify like or similar items.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A bait rack comprising:
a base including a first leg having a first portion extending in a first direction and a second portion extending generally perpendicularly to the first portion and a second leg spaced apart from the first leg and having a first portion extending in the first direction and a second portion extending generally perpendicularly to the first portion and a cross-member extending between the first leg and the second leg;
a bait support portion including a first bar and a second bar, the first bar and the second bar each including a first portion coupled to and extending from the cross-member non-parallel to the first portion of the first leg and a second portion curving upwardly from the first portion, the first bar and the second bar defining an access aperture therebetween; and
a second cross-member extending generally parallel to the cross-member, the second cross-member being coupled to the first portion of the first bar and the first portion of the second bar.

2. The bait rack of claim 1, wherein the bait support portion defines a bait pocket; and
wherein bait located in the bait pocket is accessible from below through the access aperture.

3. The bait rack of claim 1, further comprising a third cross-member;
wherein the first bar includes a third portion extending angularly upwardly from the second portion;
wherein the second bar includes a third portion extending angularly upwardly from the second portion; and
wherein the third cross-member is coupled to the third portion of the first bar and to the third portion of the second bar.

4. The bait rack of claim 3, wherein the third portion of the first bar and the third portion of the second bar each extend at an angle of at least 90° relative to horizontal.

5. The bait rack of claim 1, wherein the base and the bait support portion are each formed from stainless steel and wherein the base and the base bait support portion are coupled together by welding.

6. A bait rack comprising:
at least ten bars each including a first portion extending in a first direction and a second portion extending in a second direction different from the first direction, the second direction forming an angle of at least 45° relative to horizontal, the bars being each spaced apart from one another by less than 0.5 inches; and
a support configured to support the bars above a work surface;
wherein the support includes a pair of legs, each having a first portion extending downwardly from the bars and a second portion extending away from the first portion, the second portion configured to extend along a work surface.

7. The bait rack of claim 6, wherein the support includes a cross-member extending between the legs; and
wherein the bars are coupled to the cross-member.

8. The bait rack of claim 7, further comprising a second cross-member coupled to the second portion of each of the bars.

9. The bait rack of claim 8, comprising a side member extending from first cross-member to the second cross-member.

10. The bait rack of claim 6, wherein the second portions of each of the bars extend in a direction forming an angle of at least 90° relative to horizontal.

11. The bait rack of claim 6, wherein the second portions of each of the bars extend in a direction forming an angle of more than 90° relative to horizontal.

12. The bait rack of claim 6, wherein the bars are each spaced apart from one another by less than 0.25 inches.

13. The bait rack of claim 6, comprising 15 bars.

* * * * *